United States Patent [19]

Ogino

[11] Patent Number: 4,807,943
[45] Date of Patent: Feb. 28, 1989

[54] BRAKE CONTROL SYSTEM FOR A MOTOR VEHICLE

[75] Inventor: Kinji Ogino, Saitama, Japan

[73] Assignees: Akebono Brake Industry Co., Ltd., Tokyo; Akebono Research & Development Centre Ltd., Hanyu, both of Japan

[21] Appl. No.: 130,562

[22] Filed: Dec. 8, 1987

[30] Foreign Application Priority Data

Dec. 16, 1986 [JP] Japan .................................. 61-297801

[51] Int. Cl.$^4$ ........................ B60T 8/40; B60T 13/70
[52] U.S. Cl. .................................. 303/113; 180/197; 180/244; 303/110; 303/116; 303/117; 303/119; 303/68
[58] Field of Search ................. 180/197, 244, 233; 303/113–119, 110, 93, 96, 107, 99, 97, 61, 68–69

[56] References Cited

U.S. PATENT DOCUMENTS

| | | | |
|---|---|---|---|
| 4,206,950 | 6/1980 | Elliott | 303/110 |
| 4,565,411 | 1/1986 | Seiber | 303/110 |
| 4,575,161 | 3/1986 | Vanzant et al. | 303/110 |
| 4,626,040 | 12/1986 | Ogino | 180/197 X |
| 4,641,895 | 2/1987 | Belart et al. | 303/110 X |
| 4,662,687 | 5/1987 | Leiber | 303/114 X |
| 4,708,407 | 11/1987 | Maehara | 303/119 X |

Primary Examiner—Douglas C. Butler
Attorney, Agent, or Firm—Cushman, Darby & Cushman

[57] ABSTRACT

The brake control system for use in a vehicle includes a compression cylinder device, which communicates with a fluid passage between a gate valve and a wheel cylinder. A compression piston is reciprocately disposed inside of the compression cylinder device. A cut off valve member is disposed in the compression cylinder device, which closes a fluid supply passage between a fluid chamber of the compression cylinder device and the wheel cylinder of the brake device for the driven wheel. The system further includes a valve system provided between an accumulator and the compression cylinder device. The valve system is provided for selectively supplying the brake fluid pressure in the accumulator to the compression cylinder device during the lock-preventing and acceleration slip-preventing controls.

3 Claims, 3 Drawing Sheets

BRAKE CONTROL SYSTEM FOR A MOTOR VEHICLE

FIELD OF THE INVENTION

The present invention relates to a brake control system for use in a motor vehicle. More particularly, the invention relates to a system, with a simple device, for effectively preventing driving wheel from slipping when the vehicle starts to move and accelerates, and for effectively preventing the driving and the driven wheels from locking when the brake is operated and then the vehicle decelerates, in which the component parts are so designed as to commonly be used for both controls and to perform their function suitable for each type of the controls.

BACKGROUND OF THE INVENTION

Conventional system for preventing a wheel of a motor vehicle from locking have been known, for example, a system which controls a brake fluid pressure applied to a wheel cylinder of a brake device based on a rotation status of the wheel relative to a threshold value when the brake is operated and then the vehicle decelerates.

Further, there has been a conventional system for preventing a driving wheel of a vehicle from slipping by controlling a brake force caused by a brake fluid pressure in a wheel cylinder of a brake device of the driving wheel based on a slipping status relative to a threshold value when the vehicle starts to move and accelerates.

In these conventional systems, each of the controls of the brake fluid pressure requires an individual fluid pressure circuit in order to independently increase and decrease the brake fluid pressure. In this case, moreover, it is necessary to provide an extra solenoid device for closing a fluid supply passage communicating with the wheel cylinder of brake device for the driven wheel to make the brake act merely on the driving wheel while the driven wheel is free from the brake action. Accordingly, such a conventional system may have a problem in that the fluid pressure circuit tends to become complicated, large-sized and thus raise a manufacturing cost.

SUMMARY OF THE INVENTION

The present invention is made to solve the aforesaid problem in that the necessity of providing an individual control device for preventing the vehicle wheel from locking or from slipping makes a brake control apparatus complicated in construction, large-sized and costly.

Therefore, an object of the invention is to provide a brake control system for use in a motor vehicle, having common equipments for the slip-preventing and lock-preventing controls by which any extra equipment is no longer required.

Another object of the present invention is to provide a brake control system which is not provided with an expensive solenoid device for preventing brake fluid pressure from being transmitted to the wheel cylinder of brake device of the driven wheel during the acceleration slip preventing control of the driving wheel, whereby such a brake control apparatus can be made compact and easy to operate.

In order to solve the aforesaid problems, the brake control system for use in a motor vehicle according to the present invention comprises a gate valve which closes during the lock-preventing control when the brake device is operated and the acceleration slip-preventing control when the driving wheel accelerates. The gate valve is disposed at a fluid passage which communicates a master cylinder generating a brake fluid pressure with wheel cylinders of the brake device. The system further comprises a compression cylinder device and a decompression cylinder device for preventing the wheel from locking, each communicate with a fluid passage provided between the gate valve and the wheel cylinder of the brake device for the driving wheel. A compression piston is slidably disposed in the compression cylinder device and it divides an inner space of the compression cylinder device into a fluid supply chamber and a rear chamber both which communicate with the fluid passage. The fluid chamber and a wheel cylinder of the brake device for the driven wheel are communicated by a fluid passage. A cut off valve member is installed in the compression cylinder device which closes the fluid passage according to the movement of the compression piston toward the fluid supply chamber side. The system further includes an accumulator accumulating a brake fluid pressure and a valve system provided between the accumulator and the rear chamber of the compression cylinder device. The valve system is provided for selectively supplying the brake fluid pressure in the accumulator to the rear chamber during the lock-preventing control and for exhausting the fluid pressure into a reservoir.

When a brake pedal is forced down to effect normal brake operation, the brake fluid pressure inside the master cylinder is supplied via the gate valve of normally open type and the fluid passage to the respective wheel cylinders of the brake devices for the driving and driven wheels. At that time, the decompression piston and the compression piston are not operated because the valve system including build and decay valves is not actuated.

The gate valve closes during the lock-preventing and slip-preventing controls caused by the acceleration of the driving wheel. In the, case of the lock-preventing control, because a close valve opens according to a wheel lock control signal of a control unit, the fluid pressure inside the accumulator is introduced into the back chamber of the decompression cylinder device as a controlled fluid pressure when the valve system is operated or otherwise the fluid pressure inside the back chamber exhausts into a reservoir, so that the decompression piston is moved. Consequently, the brake fluid pressure inside the decompression chamber changes, thus causing the braking force generated in the wheel cylinders to be controlled, and speed reduction control free from the wheel-locking is thus achieved. In this operation, the compression piston remains stationary.

In the case of the acceleration slip-preventing control of the driving wheel, the close valve is held closed and the decompression piston also remains stationary. Accordingly, the operation of the valve system allows the fluid pressure inside the accumulator to be introduced into the rear chamber of the compression cylinder device, causing the compression piston to move toward the fluid supply chamber side to thereby increase the brake fluid pressure inside the fluid passage. When the compression piston moves toward the fluid supply chamber side, the cut off valve member installed in the compression cylinder device interlockingly closes the fluid supply chamber directed to the wheel cylinder of brake device for the driven wheel, then the wheel cylinder of brake device for the driven wheel is prevented from communicating with the fluid supply chamber. As the compression piston moves, the brake fluid pressure inside the fluid supply chamber increases to thereby actuate the wheel cylinder of brake device for the driving wheel. The brake action thus performed and the vehicle can start to move and accelerate with minimum slipping.

PREFERRED EMBODIMENT OF THE INVENTION

Referring now to the accompanying drawings, an embodiment of the present invention will be described.

Figure 1:
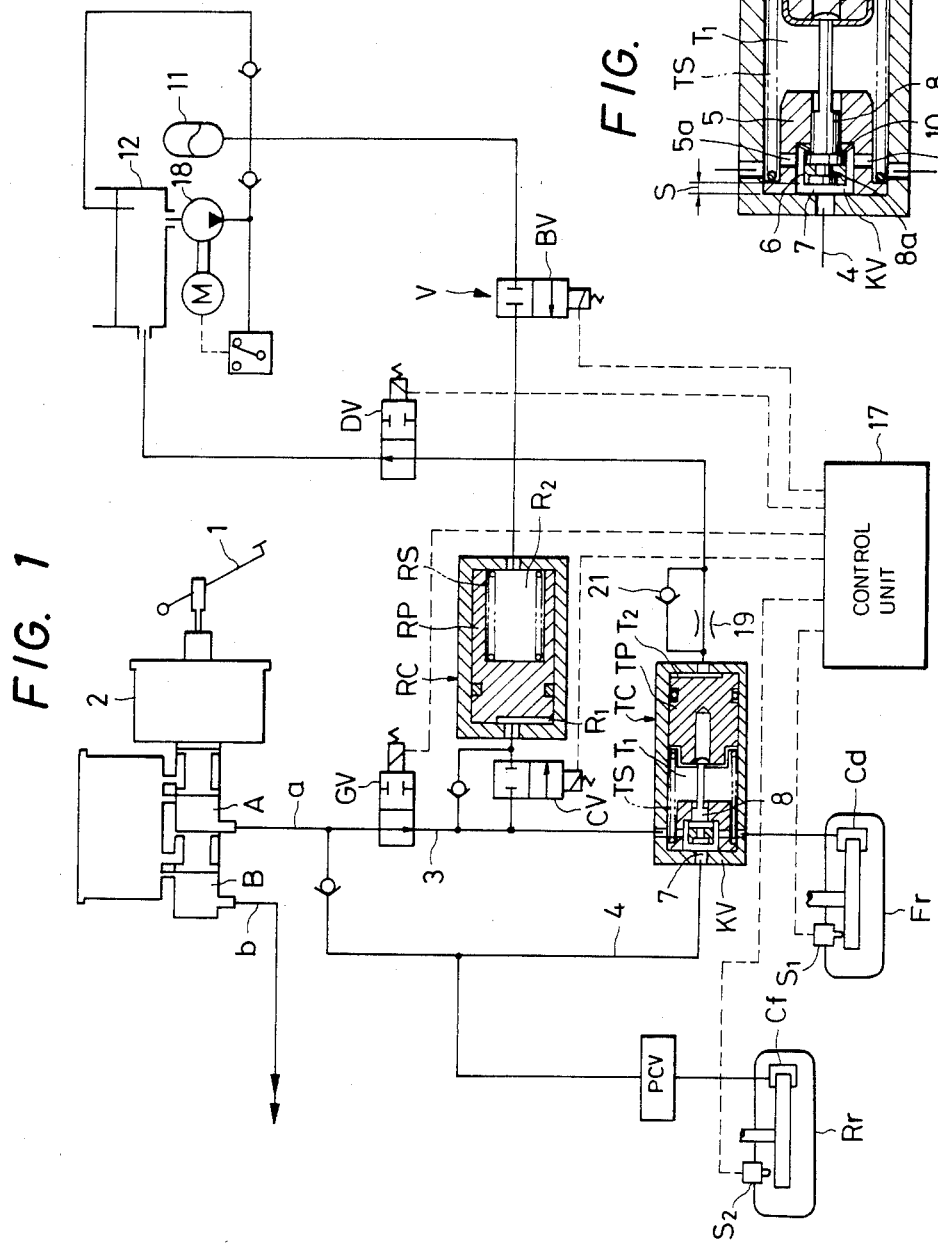
FIG. 1 is a circuit diagram showing a brake control system according to an embodiment of the present invention.
Figure 3:
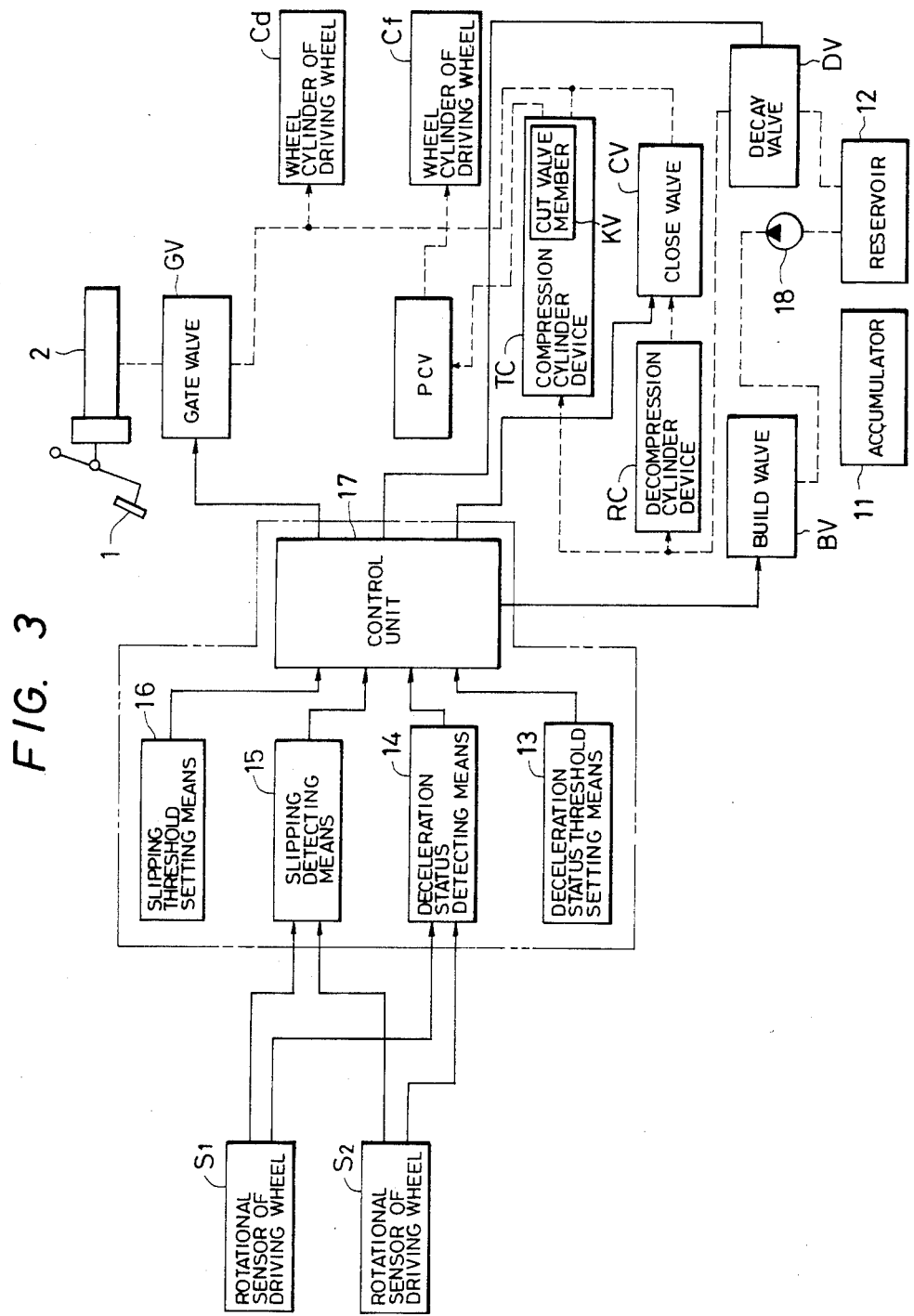
FIG. 3 shows a block diagram of the brake fluid control system of FIG. 1.

FIG. 1 shows a fluid circuit diagram, whereas FIG. 3 shows a block diagram of its control system.

A master cylinder 2 generates a brake fluid pressure proportioned to a force applied by a brake pedal 1. The master cylinder 2 comprises a fluid chambers A and B. The brake fluid pressure in the fluid chamber A is supplied, through a fluid passage a and a gate valve GV to an A brake system including, for example, a front-and-left driving wheel Fr and a rear-and-right driven wheel Rr of the vehicle. Similarly, a brake fluid pressure in the fluid chamber B is supplied, through a fluid passage b and another gate valve (not shown in FIG. 1), to a B brake system including a front-and-right driving wheel and a rear-and-left driven wheel of the vehicle (both not shown in the figure).

A specific flow control will be described below with respect merely to the A brake system. The fluid chamber A is connected via the fluid passage a, the gate valve GV of normally open type, a fluid passage 3 and a close valve CV to a decompression cylinder device RC and to a compression cylinder device TC. The fluid chamber is connected via a fluid supply chamber Tl of the compression cylinder device TC, a fluid supply passage 4 and a known proportioning valve PCV to a wheel cylinder Cf of a brake device for the driven wheel Rr and via the fluid supply chamber Tl to a wheel cylinder Cd of a brake device for the driving wheel Fr.

An inner space of the decompression cylinder device RC is divided by a decompression piston RP into a decompression chamber R1 facing the close valve CD and a back chamber R2 facing a valve system V including build and decay valves BV and DV as described later, whereas the decompression piston RP is urged by a spring RS toward the decompression chamber 1l side.

Figure 2:
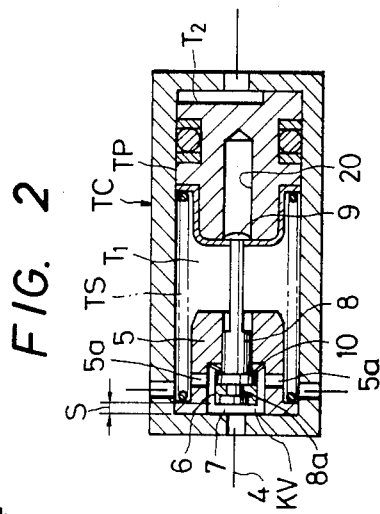
FIG. 2 is an enlarged vertical sectional view of a compression cylinder device shown in FIG. 1.

As shown by an enlarged vertical sectional view of FIG. 2, an inner space of the compression cylinder device TC is divided by a compression piston TP into the fluid supply chamber T1 and a rear chamber T2 facing the valve system V, whereas the compression piston TP is urged by a spring TS toward the rear chamber T2 side.

A valve member 5 is disposed inside the fluid supply chamber T1 of the compression cylinder device TC and provided with a valve chamber 6 and a through-hole 5a for communicating the valve chamber 6 with the liquid supply chamber T1.

A cut off valve member KV is installed in the compression cylinder device TC and utilized to close a port 7 in accordance with the movement of the compression piston TP toward the fluid supply chamber T1 side, the port 7 being formed in the compression cylinder TC to connect the valve chamber 6 with the fluid supply passage 4. The cut off valve member KV is adapted to causing a valve element 8a fitted to the front end of a stem 8 slidably inserted both in the valve member 5 and in the compression piston TP to stop up the port 7.

More specifically, the stem 8 is hooked by a flange 9 thereof so that it is prevented from moving away by a predetermined distance from the compression piston TP and simultaneously energized by a spring 10 in a direction in which it approaches the port 7.

The elastic force of the spring TS is set greater than that of the spring 10. Accordingly, a space S is maintained because of the hooking action of the flange 9 to the port 7 in the state of FIGS. 1 and 2 wherein no fluid pressure has been introduced into the rear chamber T2.

When the compression piston TP is urged by the fluid pressure introduced into the rear chamber T2 to move toward the fluid supply chamber T1 side to the extent of the space S, the valve element 8a comes in contact with the port 7, thereby the fluid supply passage 4 is separated from the valve chamber 6, i.e., the fluid supply chamber T1.

The valve system V thus exemplified consists of a build valve BV of a normally close type for introducing the fluid pressure inside an accumulator 11 into the back chamber R2 and the rear chamber T2 as it opens and the decay valve DV discharging the fluid pressure inside the back chamber R2 and the rear chamber T2 into a reservoir 12 as it opens. The valve system V is controlled as follows:

FIG. 3 is a block diagram of a control circuit for the purpose.

Rotational sensors S1, S2 are employed to detect the speed of rotation of the driving and driven wheels Fr, Rr. The deceleration ratio of the wheel in the marginal state where no wheel-locking is produced at the time of brake application is set by deceleration status threshold setting means 13 in the form of, e.g., a deceleration status threshold in consideration of the deceleration status of the vehicle. Further, the deceleration ratio present at the time of brake application is computed by means of deceleration status detecting means 14 according to the ratio of the changed value detected by the rotational sensors S1, S2. The slipping ratio of the driving wheel Fr at the time of starting the vehicle is computed by a slipping detecting means 15 in accordance with the output of the rotational sensor S2 of the driven wheel Rr as a reference and there is set a slipping ratio at which the tire-to-road surface adhesive coefficient is maximized by using slipping threshold setting means 16.

The deceleration status detecting means 14, the slipping detecting means 15, the deceleration status threshold setting means 13 and the slipping threshold setting means 16 each may be formed of microcomputers. A control unit 17 formed of a microcomputer controls the gate valve GV, the cut off valve member KV, the close valve CV, the build valve BV and the decay valve DV during the lock-preventing control and the acceleration slip-preventing control of the driving wheel in such a manner that the relation of the aforesaid threshold to the aforesaid computed deceleration status remains constant.

As shown in FIG. 1, moreover, because the gate valve GV, the close valve CV, the build valve BV and the decay valve DV are controlled during normal brake operation by means of the brake pedal 1 in such a manner that each of them is held in a non-electrified state, the brake fluid pressure produced by the master cylinder 2 is supplied to the wheel cylinder Cd of brake device for the driving wheel and to the wheel cylinder Cf of the brake device for the driven wheel Rr after being decompressed by the proportioning valve PCV.

The decompression piston RP is stopped by the spring RS at the decompression chamber R1 because the upstream close valve CV closes. Since the compression piston TP is stopped by the brake fluid pressure and the spring TS at the rear chamber T2, the valve element 8a is separated from the port 7 and the brake fluid pressure inside the fluid passage 3 is supplied via the fluid supply chamber T1, the through-hole 5a, the valve chamber 6, the port 7 and the fluid supply passage 4 to the wheel cylinder Cf of the brake device for the driven wheel Rr. Although the fluid pressure pressurized by a pump 18 is accumulated in the accumulator 11, this fluid pressure will not act on both the pistons RP, TP as the build valve BV closes.

Figure 4:
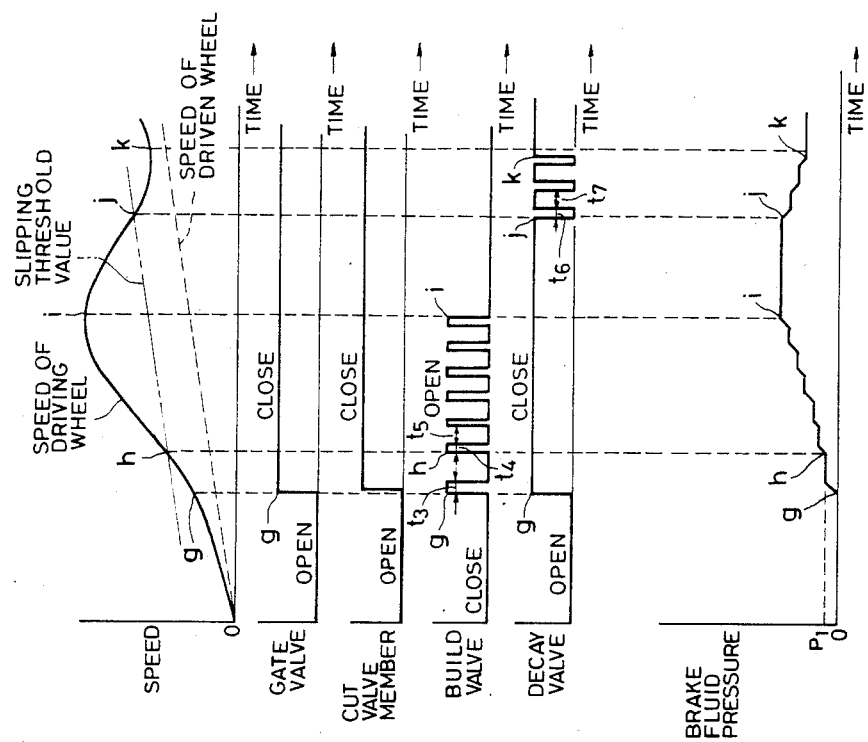
FIG. 4 is a timing chart of a control characteristic during a lock-preventing control.

When the wheel is likely to lock during the brake operation by means of the brake pedal 1, the lock-preventing control is started as shown by control characteristic charts of FIG. 4.

More specifically, the gate valve GV closes according to the instruction of the control unit 17 (i.e., a wheel lock detection signal) at a point d in FIG. 4 where the vehicle speed is well lower than the deceleration status threshold value and the brake fluid pressure inside the wheel cylinders Cd, Cf and inside the fluid passage 3 close thereto is confined. The close valve CV almost simultaneously opens and the brake fluid pressure is allowed to enter the decompression chamber R1. As a result, the decompression piston RP moves toward the back chamber R2 against the elastic force of the spring RS and, because the volume of the decompression chamber R1 increases, the brake fluid pressure inside the wheel cylinders Cd, Cf falls, thus causing the braking force to reduce. The brake fluid pressure is held constant because the decay valve DV closes at a point e where the vehicle speed coincides with the deceleration status threshold and therefore the braking force also remains constant. The control unit 17 issues such instructions that the build valve BV repeats switching operation wherein it opens for a very little time period t1, at a point f where the vehicle speed further recovers and coincides with, e.g., the vehicle speed and subsequently close for a time period t2, and then causes the brake fluid pressure to increase stepwise. As the build valve BV repeats the switching operation, the fluid pressure inside the accumulator 11 is introduced into the back chamber R2 in a pulselike form and the decompression piston RP moves to the decompression chamber R1 stepwise. The brake fluid pressure inside the fluid passage 3 and the wheel cylinders Cd, Cf sequentially increases as shown in FIG. 4, so that the braking force increases.

Figure 5:
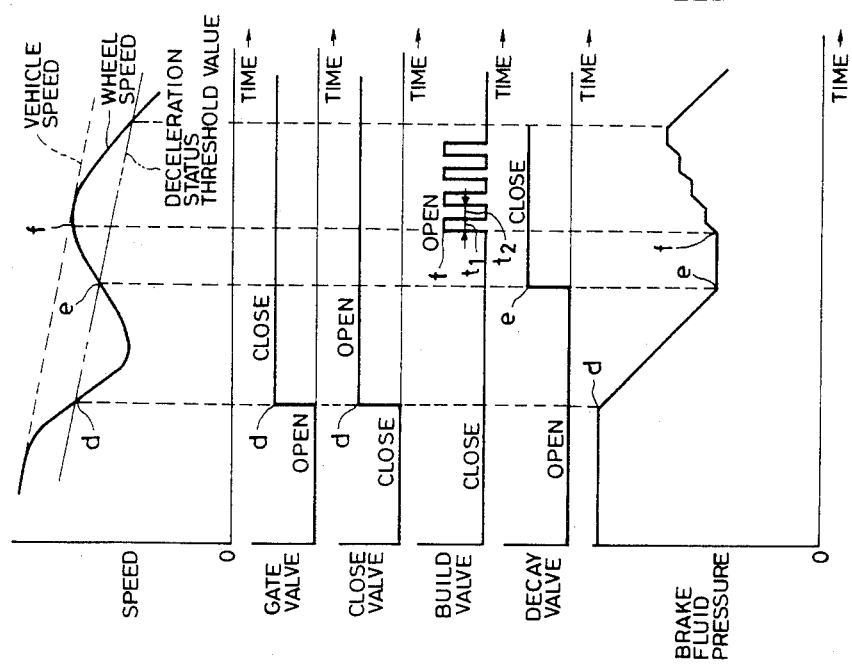
FIG. 5 is a timing chart of a control characteristic during a slip-preventing control.

The decrease, maintenance and increase of the brake fluid pressure are thus sequentially repeated and the vehicle speed is reduced to a desired extent while the driving wheel does not lock. As for the slip-preventing control at the time of starting the vehicle, both the gate valve GV and the decay valve DV both close as instructed by the control unit 17 when the driving wheel begins to slip at a point as the speed difference between the driving and driven wheels Fr, Rr becomes greater than a predetermined value as shown by control characteristic charts of FIG. 5. At this time, the build valve BV opens for a very little time period t3 only and the fluid pressure inside the accumulator 11 is squeezed by a throttle 19 and slowly penetrates into the rear chamber T2. The compression piston TP starts moving toward the fluid supply chamber T1 side against the elastic force of the spring TS, then the spring 10 in a compressed state up to this time restores to the original state to have the stem 8 move toward the port 7 side. When the compression piston TP moves to the extent of the space S, the valve element 8a tightly sticks to the port 7 and, because the flange 9 idly moves in a blind hole 20, the compression piston TP only moves toward the fluid supply chamber T1. Consequently, the fluid pressure inside the fluid passage 3 is preliminary pressurized and the brake fluid pressure is introduced into the wheel cylinder Cd of brake device for the driving wheel Fr, so that the brake device Cd is positioned in the initial operating state, i.e., in the state where the brake is dragged, so to speak. Consequently, no brake action is produced in the wheel cylinder Cf of the brake device for the driven wheel Rr separated from the fluid supply chamber T1. As the acceleration slipping of the driving wheel grows, the build valve BV opens for a little time period t4 only according to the wheel slip detecting signal from the control unit 17 at a point h where the driving wheel speed coincides with the slipping threshold and it closes for a little time period t5. This switching operation repeats to have the fluid pressure inside the accumulator to act on the rear chamber T2 in a pulselike manner and the compression piston TP moves to the fluid supply chamber T1 stepwise, thus causing the brake fluid pressure inside the fluid passage and the wheel cylinder Cd of brake device for the driving wheel to rise gradually as shown in FIG. 5, and the wheel-slipping caused by the acceleration of the driving wheel decreases as the braking force increases. The opening time t4 of the build valve BV is set at a sufficiently small value and at a value smaller than that of the opening time t1 of the build valve BV for the lock-preventing control, whereby the rise of the brake fluid pressure becomes moderate suitable for preventing the acceleration slipping of the driving wheel.

When the driving wheel speed reaches, e.g., a high peak value (point i in FIG. 5), the build valve BV is kept closed and the brake fluid pressure is held. At a point j where the driving wheel speed is reduced by the braking force acting on the wheel cylinder Cd and coincides with the slipping threshold, the decay valve DV opens for a little time period t6 and subsequently closes for a little time period t7 as instructed by the control unit 17. This switching operation repeats to cause the fluid pressure inside the rear chamber T2 to be quickly discharged from a one way valve 21 into the reservoir 12 and the compression piston TP moves toward the rear chamber T2 stepwise, so that the brake fluid pressure inside the wheel cylinder Cd gradually drops as shown in FIG. 5. When the driving wheel speed reaches a low peak value (point k), the repetition of the switching operation of the decay valve DV is stopped.

The cycle of the increase, maintenance and decrease of the brake fluid pressure repeats and consequently the control of driving force is optimized by making use of the tire-to-roadsurface adhesion coefficient to the utmost. The excessive wheel-slipping produced can be cancelled quickly in that manner, so that the vehicle speed is improved.

In the brake control system thus constructed according to the present invention, since the cut off valve member KV is utilized to close the fluid supply passage 4 communicating the fluid supply chamber Tl of the compression piston TP with the wheel cylinder Cf of the brake device for the driven wheel Rr in accordance with the movement of the compression piston TP toward the fluid supply chamber Tl side, the fluid supply passage 4 is kept opened during the normal brake operation wherein the compression piston TP does not move toward the fluid supply chamber Tl side and also during the lock-preventing control and, therefore, the driven wheel Rr is controlled by the brake action.

With respect to the acceleration slip-preventing control of the driving wheel, the compression piston TP is moving toward the fluid supply chamber Tl side and no brake fluid pressure is introduced into the wheel cylinder Cf of the brake device for the driven wheel Rr since the cut valve member KV holds the fluid supply passage 4 closed. Accordingly, the brake action acts on the driving wheel Fr only and starting and acceleration with the minimum slipping are performed.

Since the cut off valve member KV is employed for shutting the way between the wheel cylinder Cf of the brake device for the driven wheel Rr and the fluid passage 3 in accordance with the movement of the compression piston TP during the acceleration slip-preventing control of the driving wheel, it is unnecessary to provide an expensive solenoid separately and the fluid pressure circuit is made simple and compact. Moreover, since the valve system V can commonly be used for preventing the wheel from locking and from the acceleration slipping of the driving wheel, together with the unnecessity of additionally providing such a solenoid, the brake control system according to the present invention is made compact and inexpensive.

What is claimed is:

1. A brake control system for use in a motor vehicle having a driving wheel and a driven wheel, comprising:
   a master cylinder generating a fluid pressure for a brake;
   a brake device having a wheel cylinder;
   a fluid passage communicating said master cylinder with said wheel cylinder;
   a gate valve provided at said fluid passage, said gate valve closing during the lock-preventing and the acceleration slip-preventing controls when said brake is operated;
   a compression cylinder device provided at said fluid passage between said gate valve and said wheel cylinder of said brake device, said compression cylinder device having a compression piston reciprocably disposed therein, said compression piston dividing an inner place of said compression cylinder device into a fluid supply chamber communicating with said fluid passage and a rear chamber;
   means provided inside said compression cylinder device for closing the fluid passage between said fluid supply chamber and said wheel cylinder of said brake device for said driven wheel in accordance with the movement of said compression piston toward said fluid supply chamber side;
   an accumulator accumulating a brake fluid pressure; and
   a valve system provided between said accumulator, a reservoir and said rear chamber of said compression cylinder device, said valve system selectively supplying the brake fluid pressure in said accumulator to said rear chamber and exhausting said brake fluid pressure in said rear chamber to said reservoir during the acceleration slip-preventing control of said driving wheel.

2. The brake control system of claim 1, wherein said closing means comprises a cut off valve member having a valve chamber and a through-hole communicating between said valve chamber and said fluid supply chamber said cut valve member controlling fluid supply to said driven wheel, a valve element supported by said valve member, and a port facing said valve element, said port communicating said valve member with said wheel cylinder of said brake device for said driven wheel, said valve element being capable of closing said port.

3. The brake control system of claim 2, wherein said closing means further comprises a stem slidably inserted both in said cut off valve member and in said compression piston, said valve element being fitted to an end of said stem at said valve chamber side thereof, said valve element being normally spaced a predetermined distance apart from said port.

* * * * *